United States Patent [19]
Kurasawa

[11] Patent Number: 6,137,196
[45] Date of Patent: *Oct. 24, 2000

[54] MOTOR FOR DRIVING MAGNETIC DISK

[75] Inventor: Toshio Kurasawa, Miyota-machi, Japan

[73] Assignee: Minebea Co., Ltd., Nagano, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/159,605

[22] Filed: Sep. 24, 1998

[30] Foreign Application Priority Data

Sep. 26, 1997 [JP] Japan ................................. 9-262079

[51] Int. Cl.⁷ ..................................................... H02K 5/24
[52] U.S. Cl. ............................................ 310/51; 310/67 R
[58] Field of Search ............................ 310/51, 91, 67 R; 360/99.04, 99.08, 98.07

[56] References Cited

U.S. PATENT DOCUMENTS

| | | | |
|---|---|---|---|
| 4,647,803 | 3/1987 | Von Der Heide et al. | 310/51 |
| 4,760,299 | 7/1988 | Dickie et al. | 310/91 |
| 5,177,650 | 1/1993 | Jabari et al. | 360/99.08 |
| 5,241,229 | 8/1993 | Katakura et al. | 310/51 |
| 5,334,895 | 8/1994 | Morioka et al. | 310/67 R |
| 5,365,388 | 11/1994 | Maughan et al. | 360/99.04 |

FOREIGN PATENT DOCUMENTS 0 425 478 A2  12/1984  European Pat. Off. .
WO 95/34115  12/1995  WIPO .

*Primary Examiner*—Nick Ponomarenko
*Assistant Examiner*—Tran N Nguyen
*Attorney, Agent, or Firm*—Staas & Halsey, LLP

[57] ABSTRACT

A motor for driving a magnetic disk characterized by that it has a noise cutoff layer 121 for noise blocking interposed between the inner side of the stator 116 and the center shaft and the stator 116 is positioned in a fixing portion and adhesively attached thereto. The noise cutoff layer 121 is provided either by an air gap or a substance filled therein which transmits noise less than the laminated core of the center shaft and the stator. Further, the substance filled in the noise cutoff layer 121 may be a porous substance. Still further, a noise blank sheet 123 may be interposed between the stator 116 and the flange 100 on which the stator is fixed.

4 Claims, 4 Drawing Sheets

MOTOR FOR DRIVING MAGNETIC DISK

BACKGROUND OF THE INVENTION

1. Field of the Invention

The present invention relates to a motor for driving magnetic disk and more particularly to a motor for driving magnetic disk adapted to prevent vibrational noise of the driving motor from being transmitted to the magnetic disk device.

2. Description of the Prior Art

The progress in technologies in recent years to provide high performance computers, personal computers in particular, is remarkable. Also remarkable is achievement of extremely high speed operation of the computer. Keeping pace with it, realization of ever higher performance of spindle motors for driving magnetic disk is strongly demanded. While achievement of high performance is demanded, it is also demanded to provide magnetic disks driving motors being simple in structure and manufactured at low cost.

There has been made a proposal to meet such demands and a magnetic disk driving motor realizing it is disclosed in the gazette of Japanese Patent No. 2590334. This magnetic disk driving motor is, in a motor for driving magnetic disk including, as shown in FIG. 4, a fixing frame 1b, a center shaft 47 set up on the fixing frame 1b, a pair of bearings 37 and 38 fitted over the large-diametrical portion 49 of the center shaft 47 with a predetermined distance apart from each other, a rotor frame 12a in a cup form fitted over the pair of bearings 37 and 38, a permanent magnet 45 mounted on the rotor frame 12a, laminated cores 6 constituting armatures 5, and armature coils 21 would around the laminated cores 6, characterized in that the fixing frame 1b is provided with a center axial pipe 2b, the small-diametrical portion 48 of the center shaft 47 is put inside the free end portion of the center axial pipe 2b, the laminated core 6 is fitted over the outer peripheral face of the center axial pipe 2b, a hole 35 is made in the fixing frame 1b, and a lead wire 23 from the armature coil 21 is led out through the hole 35, whereas the rotor frame 12a has a cylindrical wall 43, which is provided with a disk supporting table 15 for mounting a magnetic disk such that the magnetic disk is mounted around the cylindrical wall 43.

Further, referring to FIG. 4, reference numeral 29 denotes a flange, 32 denotes a large-diametrical portion formed at the base portion of the center axial pipe 2b, 33 denotes a medium-diametrical portion contiguous to the large-diametrical portion 32, and 34 denotes a printed board.

In the above described prior art example, the rotor frame 12a borne by the pair of bearings 37 and 38 for rotation is held in a cantilevered manner on the center shaft 47 mounted on the center axial pipe 2b having the armatures 5 fixed thereon. Therefore, though the side wall 43 of the rotor frame 12a is extended so as to cover the outer periphery of the armature 5, it is enabled to make accurate concentric rotation not swaying with respect to the armature 5. Accordingly, the magnetic disk set on the rotor frame 12a can make accurate rotation free from irregularities such as swaying. Further, since the motor is not provided with end plates surrounding the armature 5 on the side of the fixing frame 1b, the number of the components can be decreased and it is made possible to lead out the coil lead wire 23 through the hole 35 made in the fixing frame 1b and, hence, the structure of the whole of the motor can be greatly simplified. Further, since the armature 5 is fixed on the outer peripheral face of the center axial pipe 2b on which the center shaft 47 is mounted, such an effect is stated to be obtained that stress is applied radially and inwardly toward the center axial pipe 2b by the installation of the armature 5 so that the small-diametrical portion 48 of the center shaft 47 is compressed and, thereby, the center shaft 47 is fixed more securely to the center axial pipe 2b.

In the above described prior art example, however, since the laminated core 6 is press-fitted over the periphery of the medium-diametrical portion 33 of the cylindrical center axial pipe 2b rising from the fixing frame 1b, there is such a defect that vibration or noise generated from the armature coil 21 would around the laminated core 6 is transmitted from the interior of the laminated core 6 to the magnetic disk through the center shaft 47 and the rotor frame 12a. Further, when laminated core 6 is press-fitted over the center axial pipe 2b, it sometimes occurs that a large stress is applied to the medium-diametrical portion of the center shaft 47 and, thereby, the same is deformed and the positional accuracy of the rotor frame is deteriorated.

The present invention was made to overcome the difficulties as described above and it is an object of the present invention to provide such a motor for driving a magnetic disk, in a motor for driving a magnetic disk having a stator for generating a revolving magnetic field, exciting magnetic poles formed of a permanent magnet disposed around the stator in confronting relationship therewith, and a rotor frame in a cup form having the exciting magnetic poles on the inner side of its lower portion, rotatably held on a center shaft in a cantilevered manner, and supporting a magnetic disk, that is adapted not to transmit noise generated from the stator to the magnetic disk.

SUMMARY OF THE INVENTION

In order to achieve the object of the present invention, there is provided a motor for driving a magnetic disk having a stator for generating a revolving magnetic field, exciting magnetic poles formed of a permanent magnet disposed around the stator in confronting relationship therewith, a rotor frame in a cup form having the exciting magnetic poles on the inner side of its lower portion, rotatably held on a cylindrical shaft in a cantilevered manner, and supporting a magnetic disk, characterized in that a noise cutoff layer for blocking noise is interposed between the inside of the stator and the center shaft and the stator is positioned in a fixing portion and adhesively fixed thereto. The noise cutoff layer is provided either by an air gap or a substance filled therein that transmits less noise than the laminated core of the center shaft and the stator. Further, the substance filled in the noise cutoff layer may be a porous substance. Still further, a noise blank sheet may be interposed between the stator and the flange on which the stator is fixed.

DESCRIPTION OF THE PREFERRED EMBODIMENTS

Figure 1:
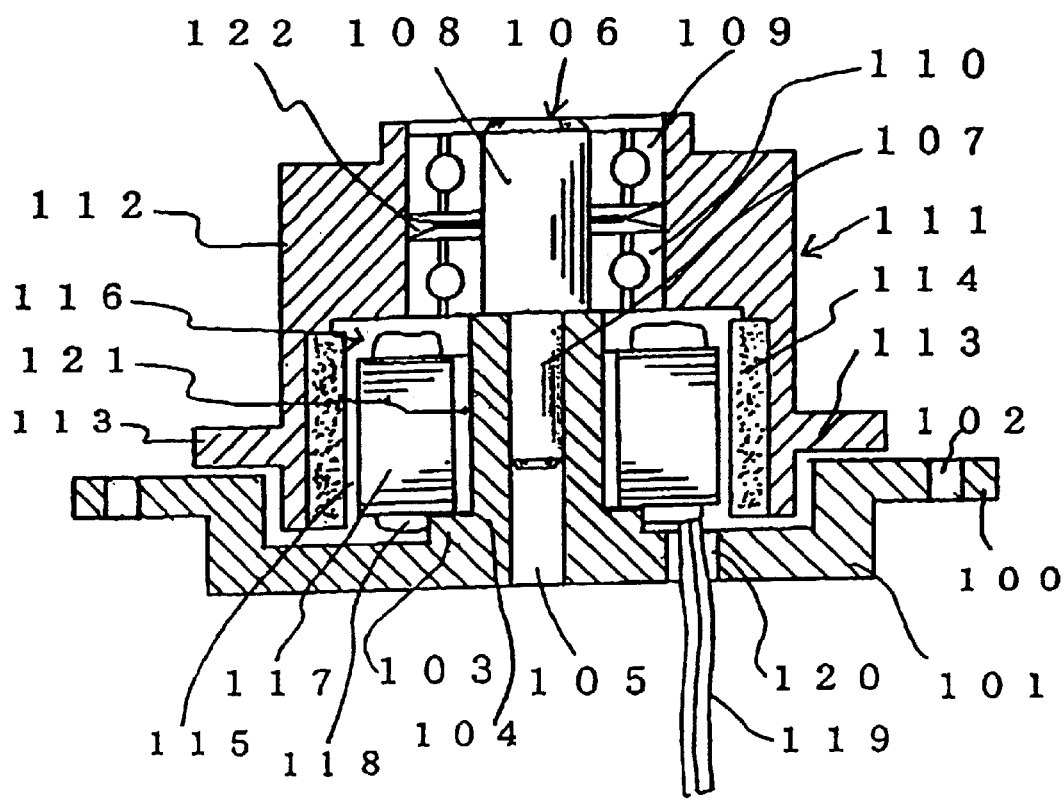
FIG. 1 is a sectional view of an embodiment of the invention.

An embodiment of the present invention will be described below in detail with reference to the accompanying drawings. FIG. 1 is a sectional view of the embodiment. Referring to FIG. 1, a magnetic disk driving motor according to the present invention has a flange 100 made of a metal such as aluminum, and in the center of the flange 100, there is provided a dish-formed recess 101. Reference numeral 102 denotes a fixing hole for fixing the flange in place. In the center of the recess 101, there is set up a pillar 104 having a step portion 103 and serving as a center shaft. In the upper end portion of a center through hole 105 made in the pillar 104, a small-diametrical portion 107 of a support shaft 106 is inserted and securely fixed in place with an adhesive agent or the like. Over the large-diametrical portion 108 of the support shaft 106, there are fitted two ball bearings 109 and 110 spaced apart a little from each other. Over the outer rings of the ball bearings 109 and 110, there is rotatably fitted a rotor cup 111. The lower end of the rotor cup 111 is extended downward to reach the bottom of the recess 101. On the peripheral wall 112 of the rotor cup 111 close to its lower end, there is provided a disk supporting table 113. The pillar 104 and the support shaft 106 are formed of a center pole shaft.

Here, it is adapted such that a plurality of magnetic disc media are arranged with a distance apart from each other above the disk supporting table 113 and along the peripheral wall 112 inserted therein but the state of the arrangement is not shown in FIG. 1. On the inner side of the peripheral wall 112, there is fixed a cylindrical permanent magnet 114 forming the exciting magnetic poles. On the inner side of the permanent magnet 114, there are provided armatures 116 with a small gap 115 apart from the permanent magnet. The armature 116 has a laminated core 117 provided with a magnetic pole at its front end and an armature coil 118 would around the same. The lead wire 119 of the armature coil 118 is led out through a hole 120 made in the recess 101.

As apparent from FIG. 1, the lower end face of the laminated core 117 is accurately positioned on the step portion 103 provided in the center of the recess 101 and securely fixed thereto with an adhesive agent or the like. Further, between the inner side of the laminated core 117 and the pillar 104, there is interposed a noise cutoff layer 121. In the present embodiment, the noise cutoff layer 121 is provided by an air gap. When seen from the side of the laminated core 117 made of a metal, the noise cutoff layer 121 provided by an air gap has an extremely high acoustic impedance. It also has an extremely high acoustic impedance when seen from the side of the pillar 104 made of a metal. Accordingly, there is formed a mismatch layer of acoustic impedance on the contact face between the noise cutoff layer 121 and the surface of the laminated core 117 or the pillar 104. Therefore, spike or vibration noise produced in the armature 116 cannot pass through the noise cutoff layer 121 and, hence, it is hardly transmitted to the pillar 104. Reference numeral 122 denotes a belleville spring interposed between the ball bearings 109 and 110.

The above noise cutoff layer 121 need not necessarily be an air gap but may be such a substance as porous ceramic or porous synthetic resin filled therein, which has a high acoustic impedance when seen from the side of the laminated core 117 or the pillar 104.

Figure 2:
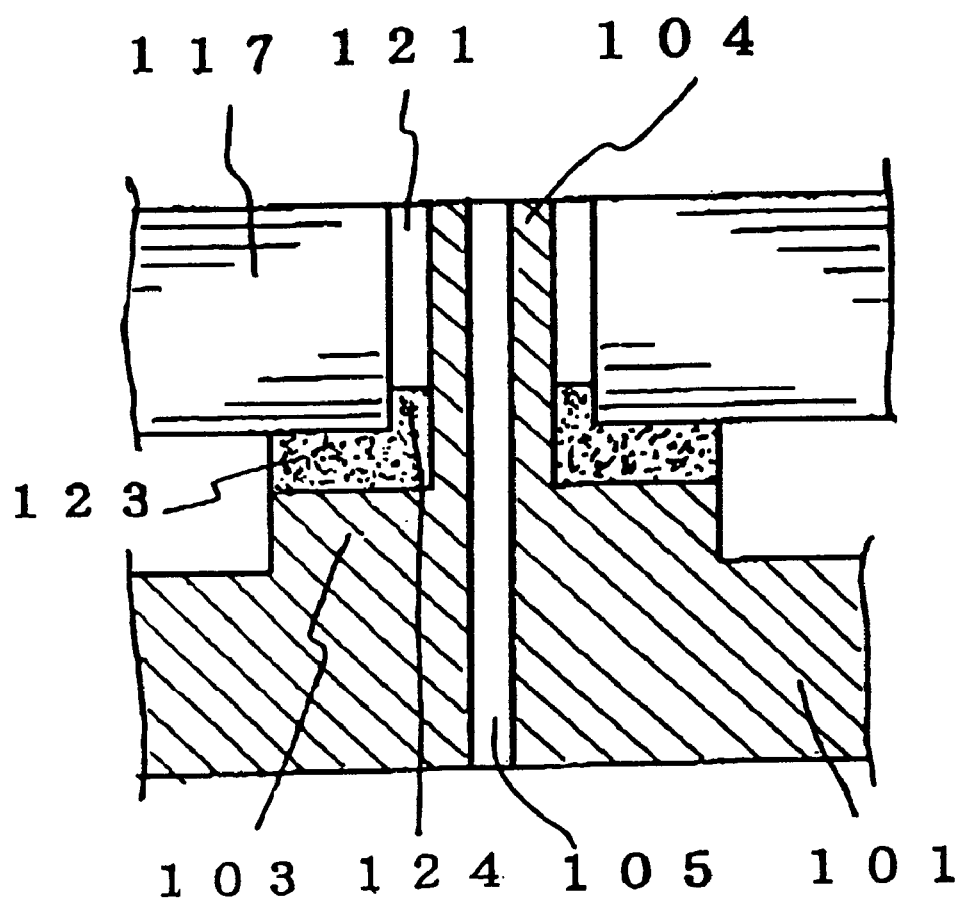
FIG. 2 is a partial sectional view of a second embodiment of the invention.

In the above described embodiment, the laminated core 117 is directly fixed on the step portion 103. Hence, noise generated in the armature 116 is propagated through this contact face and through the step portion 103 toward the rotor cup 111. To prevent this, in the next embodiment, a noise blank sheet formed, for example, of a porous ceramic or a porous synthetic resin material is interposed between the laminated core 117 and the step portion 103. Further, a step portion for positioning 124 may be formed in the center part of the noise blank sheet 123 as shown in FIG. 2 and it may be used for positioning the laminated core 117 by having it fitted over the positioning step portion 124. Further, the positioning step portion 124 may be extended upward so that the noise cutoff layer 121 is filled up with it.

Figure 3:
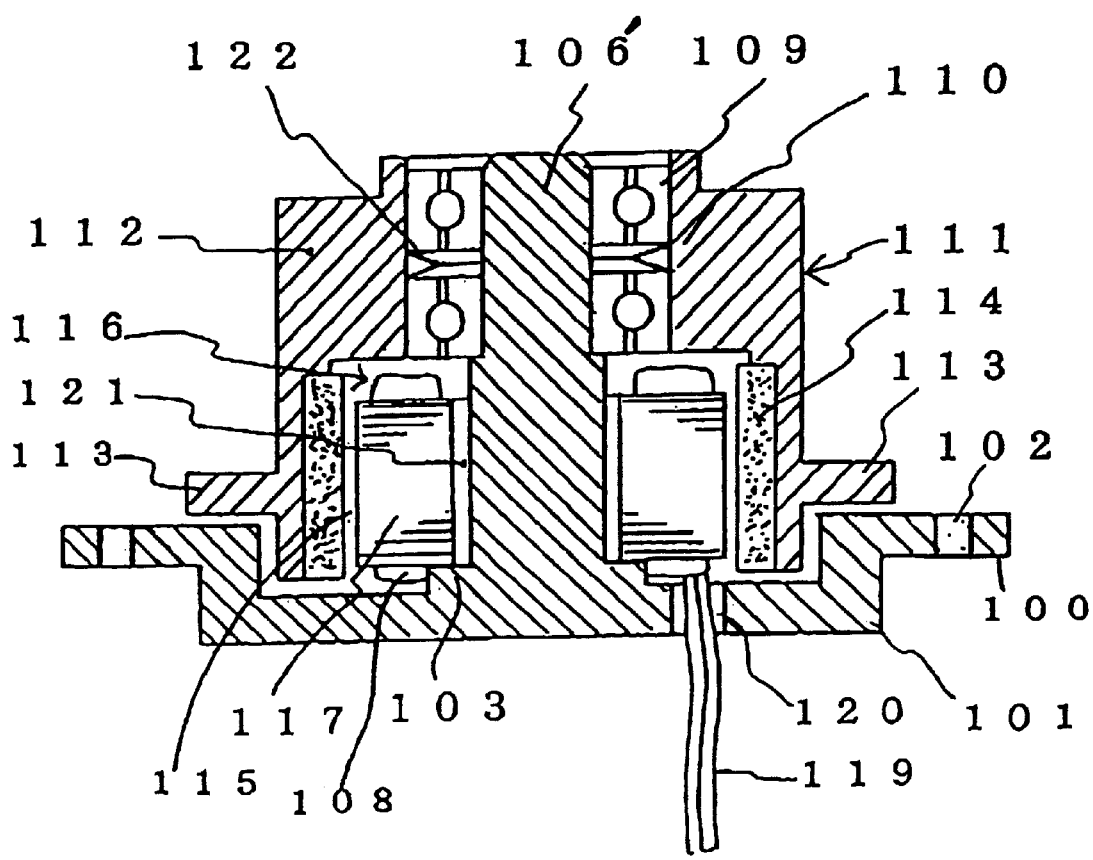
FIG. 3 is a sectional view of a third embodiment of the invention.
Figure 4:
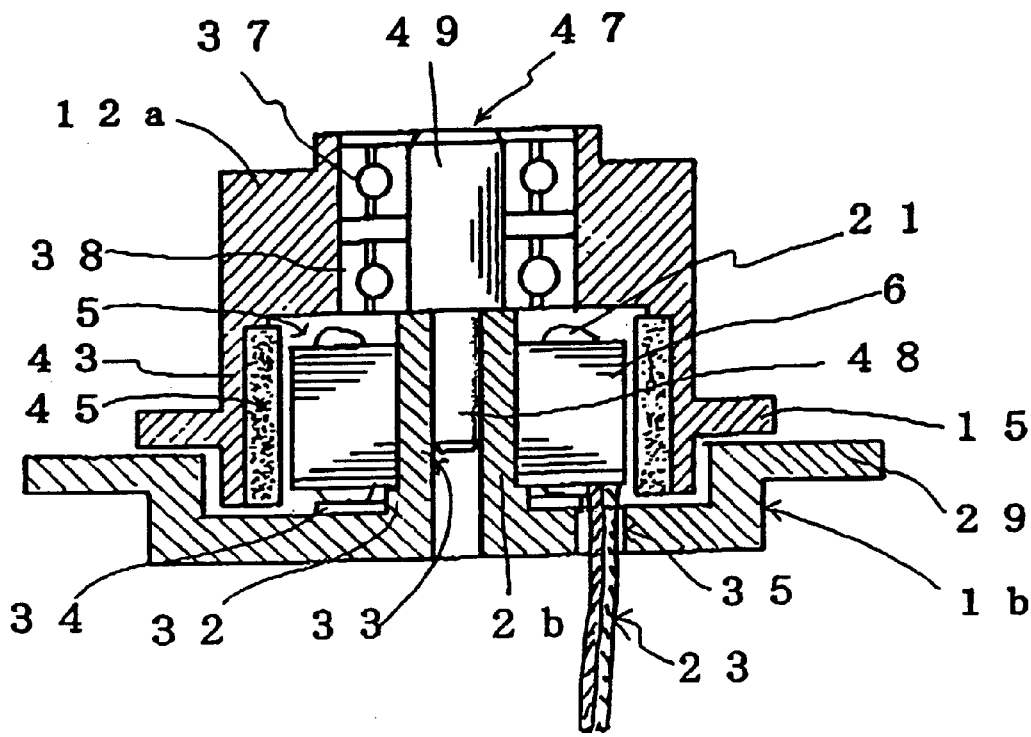
FIG. 4 is a sectional view of a prior art example.

FIG. 3 is a sectional view showing another embodiment of the invention. In this embodiment, in the center of the dish-formed recess 101 provided in the flange 100 made of a metal such as aluminum, there is set up a support shaft 106' serving as the center pole shaft, integrally formed with the flange 100. With parts like those shown in FIG. 1 denoted by like reference numerals, description thereof will be omitted. Around the front end portion of the support shaft 106', there is rotatably held the rotor cup 111 borne by the ball bearings 109 and 110. Also in this embodiment, there is formed a noise cutoff layer 121 between the support shaft 106' and the inner side of the laminated core 117. Hence, the noise cutoff layer 121 provided by an air gap seen from the side of the laminated core 117 made of a metal has an extremely high acoustic impedance. Also seen from the side of the support shaft 106', it has an extremely high acoustic impedance. Accordingly, there is formed a mismatch layer of acoustic impedance on the contact face between the noise cutoff layer 121 and the face of the laminated core 117 or the support shaft 106'. Therefore, spike or vibration noise produced in the armature 116 cannot pass through the noise cutoff layer 121 and, hence, it is hardly transmitted to the support shaft 106'. Of course, the same as in the above described embodiment, the noise cutoff layer 121 may be filled with a substance having a high acoustic impedance with seen from the side of the laminated core 117 or the support shaft 106', such as a vibration absorbing substance, a porous ceramic material, or a porous synthetic resin material. Further, though it is not shown in FIG. 3, it is also possible to interpose a noise blank sheet 123 the same as shown in FIG. 2 between the laminated core 117 and the step portion. Still further, a positioning step portion 124 the same as shown in FIG. 2 may be provided on it.

Having described the invention as related to the above embodiments, it is apparent that various variations or applications are possible within the scope of the spirit of the present invention and these variations or applications are not to be excluded from the scope of the present invention.

As described above in detail, in the present invention, a motor for driving magnetic disk having a stator for generating a revolving magnetic field, exciting magnetic poles formed of a permanent magnet disposed around the stator in confronting relationship therewith, and a rotor frame in a cup form having the exciting magnetic poles on the inner side of its lower end, rotatably held on a center shaft in a cantilevered manner, and supporting a magnetic disk, has such a configuration that a noise cutoff layer for blocking noise is interposed between the inner side of the stator and the center shaft and the stator is positioned in a fixing portion and adhesively attached thereto. Accordingly, spike noise and the like generated from the stator is prevented form propagating toward the magnetic medium through the center shaft and the rotor, the work for fixing the stator becomes easy, and, because the adhesive agent applied to the stator acts as a noise blanker of a kind, it becomes more difficult for the noise to propagate toward the magnetic medium than in the prior art example.

By providing the noise cutoff layer by an air gap, such a thing as with the prior art example that the stator compresses the center shaft can be prevented and the center shaft, during the assembly work, can be accurately disposed in the right position and, further, by filling up the noise cutoff layer with a substance transmitting less noise than the laminated core of the center shaft and the stator, such as a porous substance, the positioning of the stator at the time when it is adhesively attached to the flange becomes easier. Further, by interposing a noise blank sheet between the stator and the flange on which the stator is fixed, transmission toward the magnetic media of the noise generated from the stator becomes more difficult.

What is claimed is:

1. A motor for driving a magnetic disk, comprising:

a center pole shaft having a laminated core;

a flange having a dish-formed recess portion providing a pillar having a step portion in a center of the flange;

a stator generating a revolving magnetic field and fixed to the flange;

exciting magnetic poles having a permanent magnet disposed around the stator in a confronting relationship therewith;

a rotor frame having a cup form, the exciting magnetic poles located on an inner side of a lower portion of the rotor frame and rotatably held on the center pole shaft in a cantilevered manner supporting the magnetic disk;

a noise cutoff layer blocking noise and interposed between an inside of the stator and the center pole shaft; and a noise blank sheet made of a porous material and having a positioning step portion positioning the laminated core in the center of the noise blank sheet and the positioning step portion being extended upward, wherein the noise blank sheet fixed on the step portion and interposed between the stator and the flange and the positioning step portion is in the noise cutoff layer.

2. A motor for driving a magnetic disk according to claim 1 wherein the substance is a porous substance.

3. The motor according to claim 1, wherein the porous material is a porous synthetic resin.

4. The motor according to claim 1, wherein the porous material is a porous ceramic.

* * * * *